United States Patent
Lam

(10) Patent No.: US 8,300,114 B2
(45) Date of Patent: Oct. 30, 2012

(54) MIXED FORMAT MEDIA TRANSMISSION SYSTEMS AND METHODS

(75) Inventor: Khanh Lam, San Jose, CA (US)

(73) Assignee: Intersil Americas, Inc., Milpitas, CA (US)

( * ) Notice: Subject to any disclaimer, the term of this patent is extended or adjusted under 35 U.S.C. 154(b) by 468 days.

(21) Appl. No.: 12/363,669

(22) Filed: Jan. 30, 2009

(65) Prior Publication Data

US 2010/0194899 A1    Aug. 5, 2010

(51) Int. Cl.
*H04N 5/235* (2006.01)
*H04N 5/228* (2006.01)

(52) U.S. Cl. .................................................. 348/222.1

(58) Field of Classification Search ............... 348/207.1, 348/222.1, 231.2, 266, 207.99
See application file for complete search history.

(56) References Cited

U.S. PATENT DOCUMENTS

| | | | | |
|---|---|---|---|---|
| 4,959,862 A | | 9/1990 | Davidov et al. ............... 380/10 |
| 5,537,436 A | | 7/1996 | Bottoms et al. ............... 375/222 |
| 5,559,808 A | * | 9/1996 | Kostreski et al. ............. 370/517 |
| 5,572,517 A | * | 11/1996 | Safadi .......................... 370/431 |
| 5,701,581 A | * | 12/1997 | Eto et al. ..................... 348/14.13 |
| 5,774,193 A | | 6/1998 | Vaughan ..................... 348/723 |
| 5,936,660 A | | 8/1999 | Gurantz ...................... 348/10 |
| 6,278,498 B1 | | 8/2001 | Neff ............................ 348/723 |
| 6,369,699 B1 | | 4/2002 | Liu .......................... 340/310.01 |
| 6,377,314 B1 | * | 4/2002 | Collins et al. ................ 348/723 |
| 6,418,558 B1 | | 7/2002 | Roberts et al. ............... 725/129 |
| 6,621,527 B1 | * | 9/2003 | Limberg et al. .............. 348/725 |
| 6,711,297 B1 | * | 3/2004 | Chang et al. ................. 382/240 |
| 6,803,970 B1 | * | 10/2004 | Limberg et al. .............. 348/725 |
| 6,882,634 B2 | | 4/2005 | Bagchi et al. |
| 6,927,806 B2 | * | 8/2005 | Chan ............................ 348/731 |
| 6,952,237 B2 | | 10/2005 | Grigorian ..................... 348/484 |
| 6,986,156 B1 | * | 1/2006 | Rodriguez et al. ............. 725/95 |
| 7,003,030 B2 | | 2/2006 | Abdelilah et al. |
| 7,089,577 B1 | | 8/2006 | Rakib et al. |
| 7,248,841 B2 | | 7/2007 | Agee et al. |
| 7,352,817 B2 | * | 4/2008 | Milbar ........................ 375/259 |
| 7,359,450 B1 | * | 4/2008 | Payne et al. ................. 375/286 |
| 7,471,733 B1 | * | 12/2008 | Payne et al. ................. 375/286 |
| 2002/0168005 A1 | * | 11/2002 | Collins et al. ............ 375/240.01 |
| 2004/0041948 A1 | * | 3/2004 | Collins et al. ................ 348/555 |
| 2004/0068755 A1 | * | 4/2004 | Davies et al. ................ 725/133 |
| 2004/0181800 A1 | * | 9/2004 | Rakib et al. .................. 725/25 |
| 2005/0114903 A1 | * | 5/2005 | Ahmed et al. ............... 725/114 |
| 2008/0201758 A1 | * | 8/2008 | Davies et al. ................ 725/133 |

OTHER PUBLICATIONS

PCT International Search Report for PCT/US2010/022772 dated Jun. 7, 2010.

* cited by examiner

*Primary Examiner* — Nicholas Giles

(74) *Attorney, Agent, or Firm* — Arent Fox LLP

(57) ABSTRACT

Systems and methods for operating cameras are described. An image signal received from an image sensor can be processed as a plurality of video signals representative of the image signal. An encoder may combine baseband and digital video signals in an output signal for transmission over a cable. The video signals may include substantially isochronous baseband and digital video signals. The baseband video signal can comprise a standard definition analog video signal and the digital video signal may be modulated before combining with the baseband video signal and/or transmitting wirelessly. The digital video signal may be a compressed high definition digital video signal. A decoder demodulates an upstream signal to obtain a control signal for controlling the position and orientation of the camera and content of the baseband and digital video signals.

28 Claims, 6 Drawing Sheets

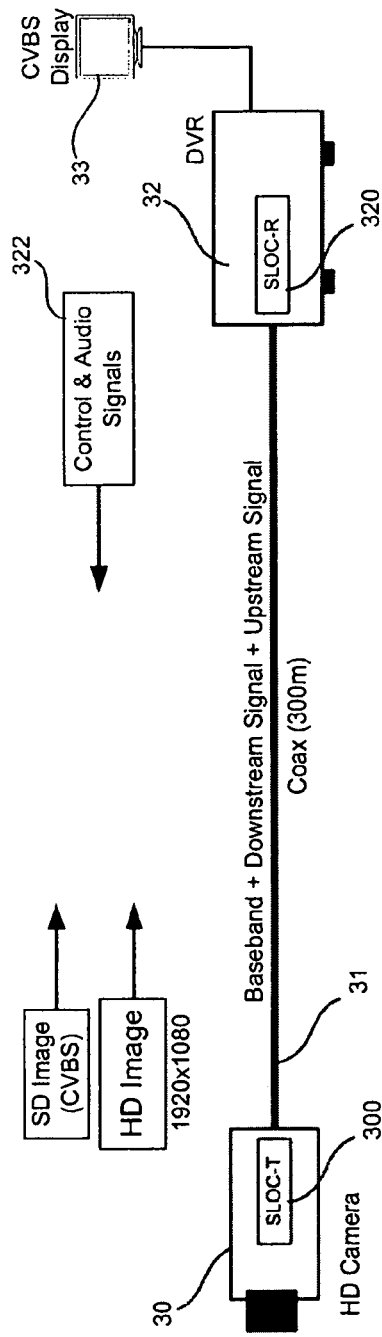
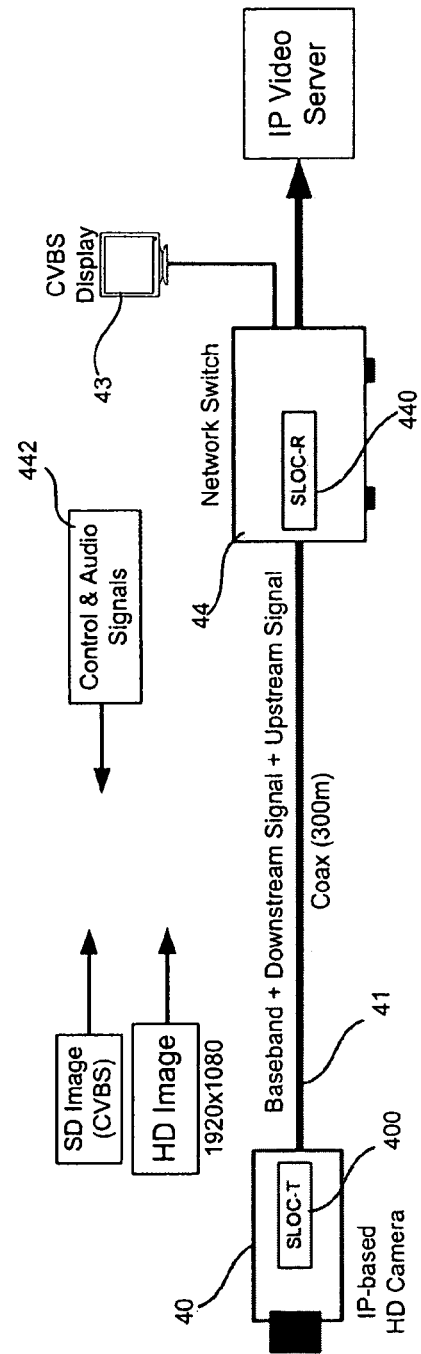
Figure 3
Figure 4

MIXED FORMAT MEDIA TRANSMISSION SYSTEMS AND METHODS

BACKGROUND OF THE INVENTION

1. Field of the Invention

The present invention relates generally to multimedia transmission systems and more particularly to systems and methods for transmitting high definition digital video and standard definition analog video over a single cable.

2. Description of Related Art

With the advent of digital broadcast television and streaming video technologies various video cameras, monitors and video recorders have become available with enhanced resolution and advanced features. Closed circuit television ("CCTV") systems now offer high definition video outputs and compressed digital video signals for use in applications such as premises surveillance, access control and remote monitoring of facilities. However, legacy systems remain in place and standard definition analog video signals are in widespread use and will continue to be used during the transition to all-digital, high-definition systems. In particular, coaxial cable ("Coax") has been deployed to carry signals from CCTV cameras to monitoring stations. Some deployed CCTV cameras transmit compressed video signals over local area networks, or wide area networks, and these cameras may use the Internet Protocol ("IP") as a communications means for transmitting the compressed video signal.

FIG. 1 illustrates conventional systems using Coax to carry standard definition analog video. A basic analog camera 10 typically generates a composite video baseband signal ("CVBS") that can be transmitted up to 300 meters using Coax 11. The CVBS signal is commonly provided to a video recording system which often comprises a digital video recorder ("DVR") 12 that records the CVBS in digital format. A conventional monitor 14 may be connected to the DVR 12 to simultaneously display the standard definition analog video, which generally has a resolution of 720×480 pixels.

Digital camera 16 may supplant analog camera 10 in some applications. The digital camera 16 may support a serial digital interface ("SDI") that can be used to transmit uncompressed standard definition digital video over Coax 17 to DVR 12 at approximately 270 Mbps.

FIG. 2 illustrates conventional approaches to transmitting high definition video (1920×1080 pixels) in currently deployed systems. First, a digital camera 20 may support a high-definition serial digital interface (HD-SDI) that can be used to transmit uncompressed high-definition digital video over Coax 21 to DVR 22 at the rate of 1.5 Gbps. The cable distance supported under such high transmission rate is up to 100 meters. Second, an IP-based, high-definition ("HD") camera 24 may generate a compressed digital HD video signal over 100 Mbps Ethernet using standard category 5 ("CAT5") twisted pair cable 25 for distances up to 100 meters. The signal is received by a DVR 22 and recorded for non-real time playback. Existing Coax 26 can be used to transmit video from camera 24 to a DVR 22 using CAT5-to-Coax bridge modems 27 and 29 or other conversion devices. The use of networking to enable the camera to transmit digital video allows these systems to add some upstream communications, typically control and audio signals 28.

BRIEF SUMMARY OF THE INVENTION

Certain embodiments of the invention provide cameras and systems and methods for operating cameras. A processor may receive an image signal from an image sensor and produce a plurality of video signals representative of the image signal. An encoder is used for combining the baseband video signal and the digital video signal as an output signal for transmission over a cable. The video signals may include a baseband video signal and a digital video signal and that are substantially isochronous. The camera may be operated as a closed circuit high definition television camera.

According to certain aspects of the invention, the baseband video signal can comprise a standard definition analog video signal and the digital video signal may be modulated before combination with the baseband video signal. The digital video signal can comprise a compressed high definition digital video signal. The frame rate of the digital video signal can be less than the frame rate of the image signal, particularly where the modulated digital signal is provided to a video recorder.

In certain embodiments, a decoder is configured to demodulate an upstream signal received from the transmission cable used to carry downstream video or from a wireless communication network. The demodulated upstream signal can comprise control signals, including signals to control the position and orientation of the camera, to control the production of the baseband video signal and the digital video signal by the processor and to select a portion of the image signal for encoding as the baseband video signal. The control signals may also include a signal to select a portion of the image signal for encoding as the digital video signal and an audio signal used to drive an audio output of the camera such as a loudspeaker.

Certain embodiments of the invention provide methods for transmitting video images. The methods may include frequency division multiplexing a video signal received from a high definition imaging device to obtain a modulated digital signal, producing an output signal by combining the modulated digital signal with a baseband analog signal representative of the video signal and transmitting the output signal simultaneously to a monitor and digital video storage device. In some of these embodiments, the monitor displays the baseband analog representation of the video signal and/or the digital video storage records a sequence of high definition frames extracted from the modulated digital signal using a digital video recorder. The digital video signal may be compressed.

In certain embodiments, transmitting the output signal includes providing the output signal to a coaxial cable and/or to a wireless transmitter. An input signal received from the coaxial cable or a wireless network may be demodulated to obtain a control signal. The baseband analog signal may be generated by encoding a portion of the video signal in a composite video signal, and the portion of the video signal to be encoded in the composite video signal may be controlled using the control signal. The control signal may control the position of the camera. Demodulating the input signal may additionally yield an audio signal from the input signal.

Certain embodiments of the invention provide systems and methods for operating cameras. A processor may receive an image signal from an image sensor and produce a plurality of video signals, control logic may be configured to respond to a control signal received by the camera and a modulator can be configured to modulate the digital video signal as a modulated signal. The plurality of video signals can include a baseband video signal and a digital video signal. Each of the plurality of video signals represents at least a portion of a field of view of the camera and the control signal may control the content of the baseband and digital video signals. The modulated signal and the baseband video signal are typically transmitted simultaneously by the camera.

The baseband and digital video signals may be substantially isochronous. An encoder can combine the baseband video signal and the modulated signal as an output signal for transmission over a cable. The control signal can be received wirelessly from a wireless network, for example. The modulated signal may be at least partially transmitted wirelessly. The digital video signal may be a high definition digital video signal and may be a compressed digital video signal. The control signal moves the portion of the field of view represented by one of the video signals.

BRIEF DESCRIPTION OF THE DRAWINGS

FIG. 3 depicts a system for transmission of analog and digital video according to certain aspects of the invention.

FIG. 4 depicts a networked system for transmission of analog and digital video according to certain aspects of the invention.

DETAILED DESCRIPTION OF THE INVENTION

Figure 1:
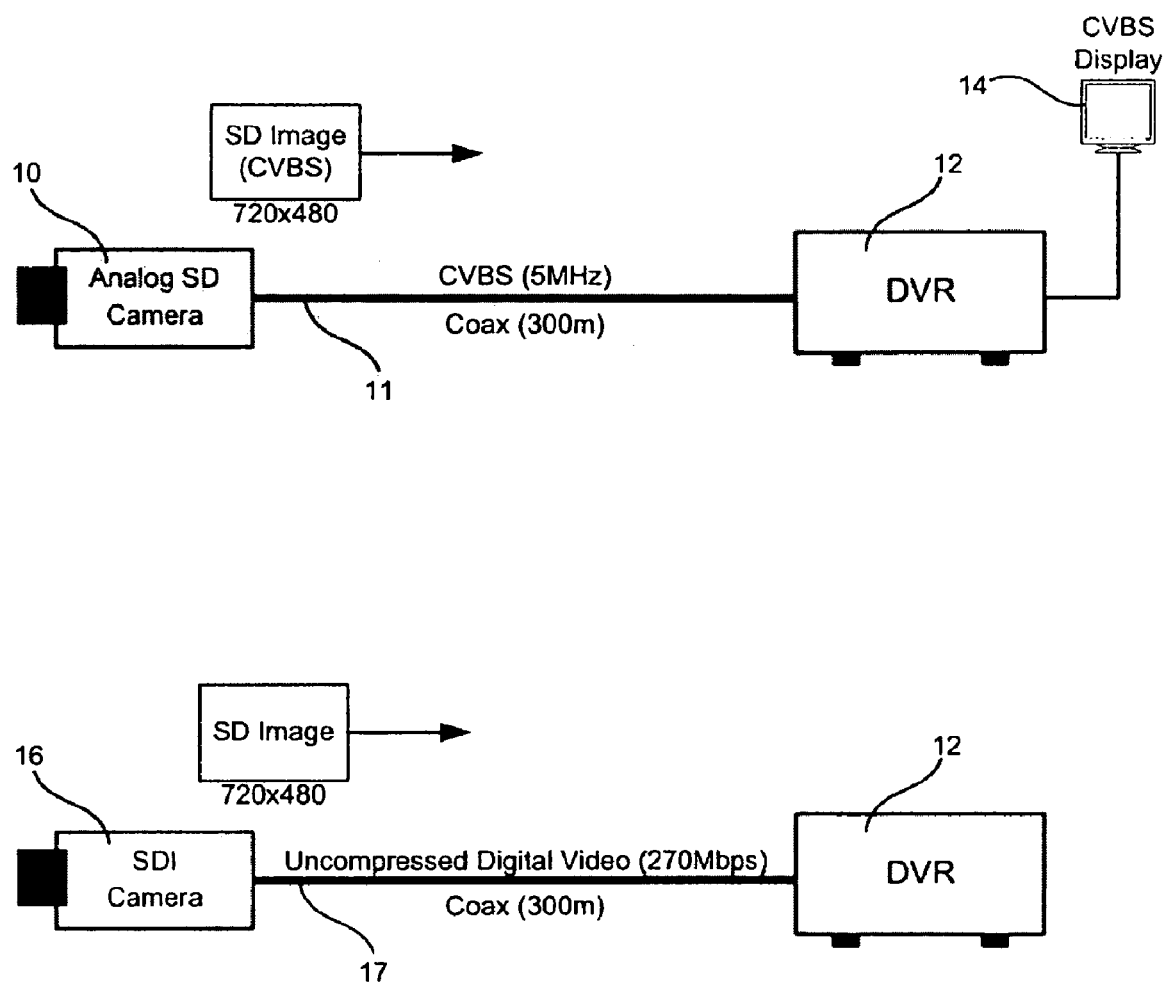
FIG. 1 illustrates a prior art system using Coax to carry standard definition analog video.
Figure 2:
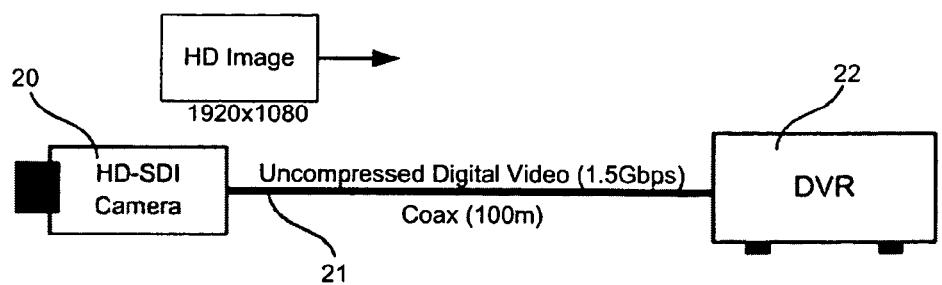
FIG. 2 illustrates prior art approaches to transmitting high definition digital video.
Figure 2:
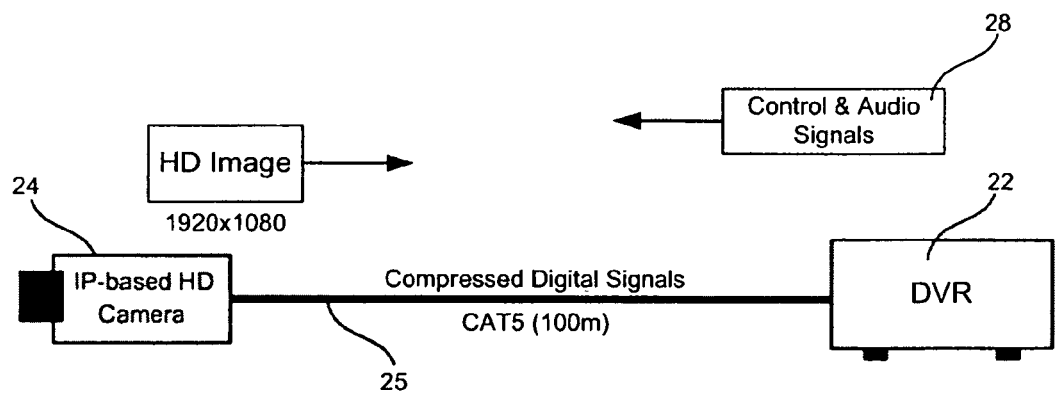
Figure 2:
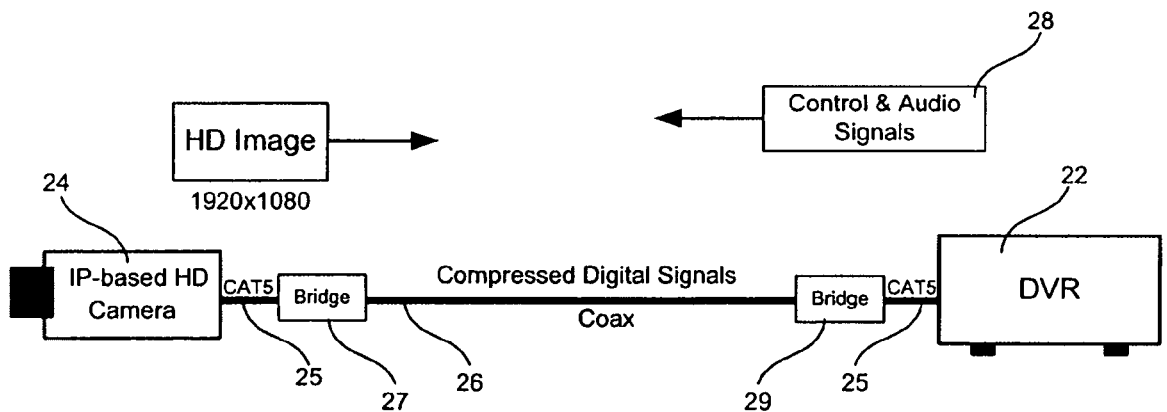

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention provide systems and methods that enable a camera to simultaneously transmit high-definition digital video and standard definition analog video over Coax. A high-definition camera is adapted to produce a compressed digital video signal and an analog baseband signal. The digital signal is modulated and transmitted in a band of frequencies separated from the upper frequencies of the baseband video signal. The analog signal may be encoded according to any desired standard, including PAL, SECAM and NTSC standards and their variants.

FIG. 3 depicts an embodiment of the present invention illustrating certain principles of operation of the invention. The example depicts deployment of HD camera 30 in a system where it is desirable to view live video produced by camera 30 while concurrently recording a high definition copy of the video on DVR 32. An example of such a system is a security or surveillance system. The function of HD camera 30 may be remotely controlled as will be described in more detail below. HD camera 30 can be adapted to produce the high definition signal and an analog CVBS signal simultaneously. In certain embodiments, the high definition signal and an analog CVBS signal are isochronous or substantially isochronous where, for example, delays in processing the signals are unequal. In one example, CVBS signal may be delayed because of digital-to-analog conversion overhead. In another example, the high definition signal may be compressed and subject to variable delay based on compression ratios, etc. In certain embodiments, CVBS and high definition signals may be synchronized or maintained in a constant time relationship with a common audio signal generated by camera 30.

Camera 30 may be adapted by adding external components or by integrating hardware and software into camera 30. In the example, a security link over coax modem ("SLOC-T 300") is provided within the camera 30. SLOC-T can be constructed as a modem integrated as an addition to camera 30 or implemented by using components already integrated into camera 30. SLOC-T 30 enables a multimedia feed to be transmitted downstream over a communications channel; as illustrated, SLOC-T 300 is a device that enables multiple signals carrying different resolution signals representative of video produced by camera 30 to be sent over a coaxial cable 31. For the sake of clarity of description, a SLOC deployed in transmitting device such as camera 30 will be referred to herein as "SLOC-T" and a SLOC provided in a receiving device such as a DVR, network switch, etc., will be referred to as a "SLOC-R." Descriptions of a SLOC-T and a SLOC-R are provided in more detail below.

SLOC-T 300 may cooperate with other components of camera 30 and/or may add enhanced functionality that enables camera 30 to operate in various modes. In one example, camera 30 may produce an uncompressed HD digital video output and SLOC-T 300 may provide an ability to compress the HD digital video signal. Thus, SLOC-T may provide capabilities beyond modulation and demodulation as necessary to enhance functionality of host camera 30. Accordingly, several SLOC-T can operate in a variety of modes, some of which are provided by way of example. In one mode, SLOC-T 300 receives a compressed HD video signal and a standard definition analog version of the signal from camera 30 and transmits both signals over coax 31. In another mode, SLOC-T 300 receives an uncompressed HD video signal and a standard definition analog version of the signal from camera 30 and transmits a compressed HD digital version of the signal together with the standard definition analog signal over coax 31. SLOC-T 300 may transmit an HD digital signal and a standard definition analog signal derived from an HD signal received from camera 30.

Figure 5:
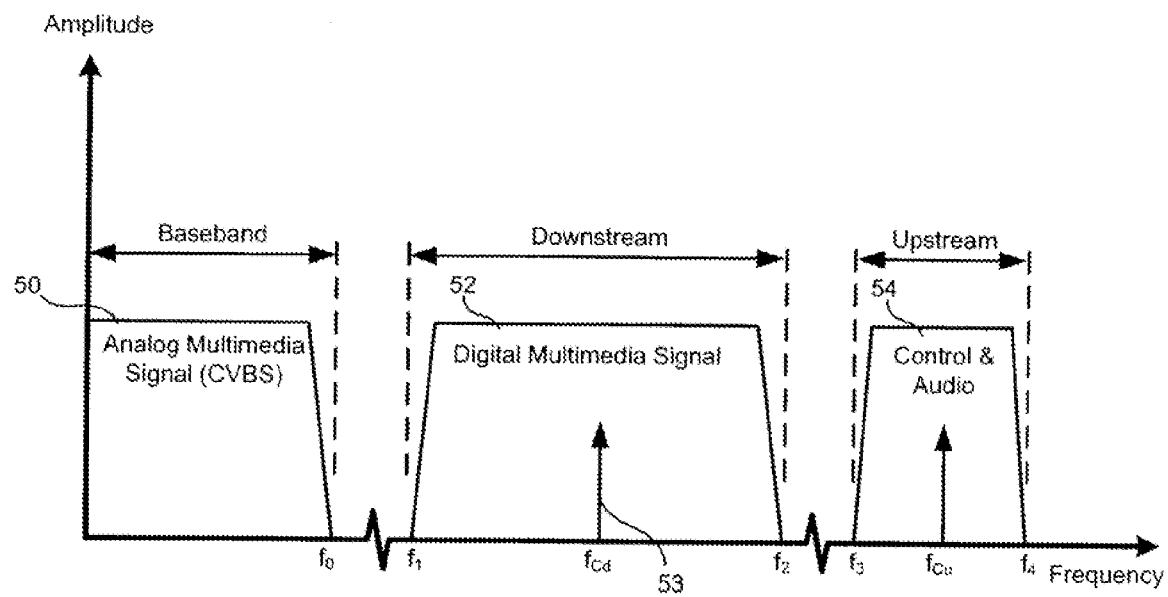
FIG. 5 shows bandwidth allocation for transmission of analog and digital video over a coaxial cable according to certain aspects of the invention.

In certain embodiments, SLOC-T 300 uses frequency division multiplexing to produce an output signal for transmission on Coax 31. In the example illustrated in FIG. 5, downstream digital signal is provided in a single band of frequencies 52 centered on a carrier 53 of frequency $f_{Cd}$. Band of frequencies 52 commences beyond the highest frequency $f_0$ of the baseband analog signal 50. This distinct band of frequencies 52 can be referred to as a channel. Channel 52 may be selected based on the capabilities of the SLOC-T 300, available bandwidth, signal bandwidths and for other reasons. In some embodiments, channel 52 may be selected for compatibility with receiving equipment. In one example, the signal may be provided directly to a standard definition television and channel 52 may be selected to ensure adequate separation from baseband signal. The band of frequencies in channel 52 may also be selected based on standards for digital video transmission when standards defined encoding of the signal is used. It is contemplated that a single digital signal may be transmitted using two or more different channels to carry portions of the digital signal.

Any suitable modulation scheme may be used to produce a transmittable version of the digital signal. For example, different types of wired and wireless connections could be used with modulation schemes such as phase shift keying ("PSK"), frequency shift keying ("FSK"), quadrature amplitude modulation, ("QAM"), orthogonal frequency division multiplexing ("OFDM"), etc. The modulation scheme is typically selected based on factors that include characteristics of the medium used for transmission, frame rate of the desired video signal and other factors that impact available bandwidth in the channel 52.

A SLOC-R modem 320 may be provided in a video capture device such as DVR 32. SLOC-R modem 320 may receive and process digital video and CVBS signals. Typically, CVBS signal is extracted and passed directly to a display system 33 for live viewing of the video images captured by camera 30. Display system 33 may be a standard definition monitor although, the display system may also receive a digitized version of the received analog signal. In one example, SLOC-R modem 320 may produce a digitized version of the analog signal for use with digital monitors or suitably equipped computers. Extraction of the baseband signal can typically be effected using a low pass filter that can be implemented using analog components or through digital signal processing techniques. The digital HD signal may be separately extracted and provided to the recording section of DVR 32. In certain embodiments, the digital HD video signal may be compressed in the DVR prior to recording. In many embodiments, the digital HD video signal is received as a compressed digital signal.

In certain embodiments, SLOC-T 300 and SLOC-R 320 are configured to support bidirectional transmission of signals. In the example of a security installation, and as will be described in detail below with reference to FIG. 6, camera 30 may include a microphone 614, loudspeaker 612, sensor 616, control interface 618 for controlling electromechanical actuators, and other features (see FIG. 6). In this example, SLOC-T 300 and SLOC-R 320 are typically configured to communicate control, audio and other data 322 to camera 30.

Referring again to FIG. 5, in one embodiment, upstream data can be communicated to camera in one or more channels 54 located at the upper end of available bandwidth. Selection of channels for communication of digital multimedia signals 52, control and audio signals 54 and other data can be selected based on available bandwidth, signal-to-noise ratios detected in the channels 52 and 54, signaling standards and/or application specific requirements. In some embodiments, channel configuration, bandwidth and signal-to-noise ratios are determined upon connection of SLOC-T 300 and SLOC-R 320 using a training sequence. Typically, training sequences are used to ascertain the signaling capabilities of predetermined or negotiated channels, to select a channel 52 for transmission of digital video and for determining available bandwidth in the selected channel 52. The characteristics of the selected channel 52 may be used to set the compression levels for the digital video signal.

In certain embodiments, upstream signal 54 includes signals that can control the content of the downstream 52 and baseband 50 signals. For example, camera optics 600 may provide a fish-eye view of location monitored by camera 60 and camera processor may be controlled to select a portion of the image for transmission as baseband signal 50. Typically, downstream digital signal 52 can provide the complete image for recording on a DVR or for additional processing. Baseband signal 50 may receive the baseband signal 50 for live monitoring of the area under surveillance. The baseband signal 50 may comprise an adjusted image that corrects for visual effects created by the fish-eye lens. A viewer of the baseband signal 50 may cause the view to move within the field of the fish-eye lens by selecting a new portion of the captured image for viewing. For example, the viewer may request a "pan-right" to move the field of view to the right. Data transmitted in upstream signal 54 then cause the camera processor to extract and process the desired portion of the field of view. In certain embodiments, the requests to move the field of view incorporated in the baseband signal 50 may cause physical movement of the camera 60. Thus, control data in upstream signal 54 may affect the content of both baseband 50 and downstream digital 52 signals.

In certain embodiments, downstream audio can be transmitted as part of the HD digital video signal and/or as part of the CVBS signal. Some downstream signaling may be carried in a separate dedicated channel (not shown). In certain embodiments, upstream communications to camera 30 may be handled using out-of-band communications methods including, for example, using wired or wireless networks. It is contemplated that certain embodiments may, as an alternative or as an additional option, transmit downstream digital signal 52 wirelessly. Thus, baseband signal 50 can be transmitted through Coax while some combination of upstream 54 and downstream 52 are transmitted wirelessly. Typically, upstream data 54 includes control signals for downstream 52 and baseband 50 signals regardless of method of transmission.

In certain embodiments, cable 31 may be provided directly to display system 33 for display of analog standard definition video. A standard definition monitor or display 33 typically includes filtering circuits that enable selection between baseband signals and standard modulated TV channels. Consequently monitor 33 may discard high frequency digitally-encoded carrier signals. DVR 32 may also be able to receive the digital video signal without additional processing if the digital video signal is transmitted in a standards-defined channel and using standards defined digital encoding. SLOC-R 320 decodes signals generated by SLOC-T 300 and provides decoded HD digital video and other signals for DVR 32. SLOC-R 320 may also encode control, audio and other data for transmission to camera 30.

Referring now to FIG. 4, an embodiment of the present invention is presented that illustrates certain principles of operation of the invention. FIG. 4 depicts an example based on a system where it is desirable to view live video produced by camera 40 while concurrently providing a high definition copy of the video on a network through network switch 44. In one example, the HD video feed is captured and streamed using an internal or external IP Video Server. HD camera 40 is typically adapted to produce the high definition signal and an analog baseband video signal simultaneously. Camera 40 may be adapted by adding external components or by integrating hardware and software into camera 40, such as SLOC-T 400. SLOC-T 400 may operate in the same manner as SLOC-T 300 featured in FIG. 3. However, SLOC-T 400 may be configured to encode a digital video signal in a manner that facilitates forwarding of the digital video signal over a network. For example, SLOC-T 400 may be programmed or otherwise configured to provide digital video signal according to a streaming format supported by the IP video server.

The multiplexed video signals transmitted by digital camera 40 can be received by a network switch 44, optionally equipped with SLOC-R 440. The baseband standard definition analog signal can be extracted and provided to display 43. In certain embodiments, SLOC-R 440 may extract and forward the digital high-definition video signal to a video server or other network device using a suitable network having sufficient bandwidth to carry the digital HD video signals. The digital HD video signal may comprise a compressed HD video signal. In certain embodiments, the digital high-definition signal extracted by SLOC-R 440 is compressed or further compressed for forwarding to a video server or other network device. SLOC-R 440 may include hardware and software for recoding and/or remodulating the digital high-definition signal for transmission on a network; for example, SLOC-R 440 may produce an H-264 signal encoded for transmission over Ethernet.

Figure 6:
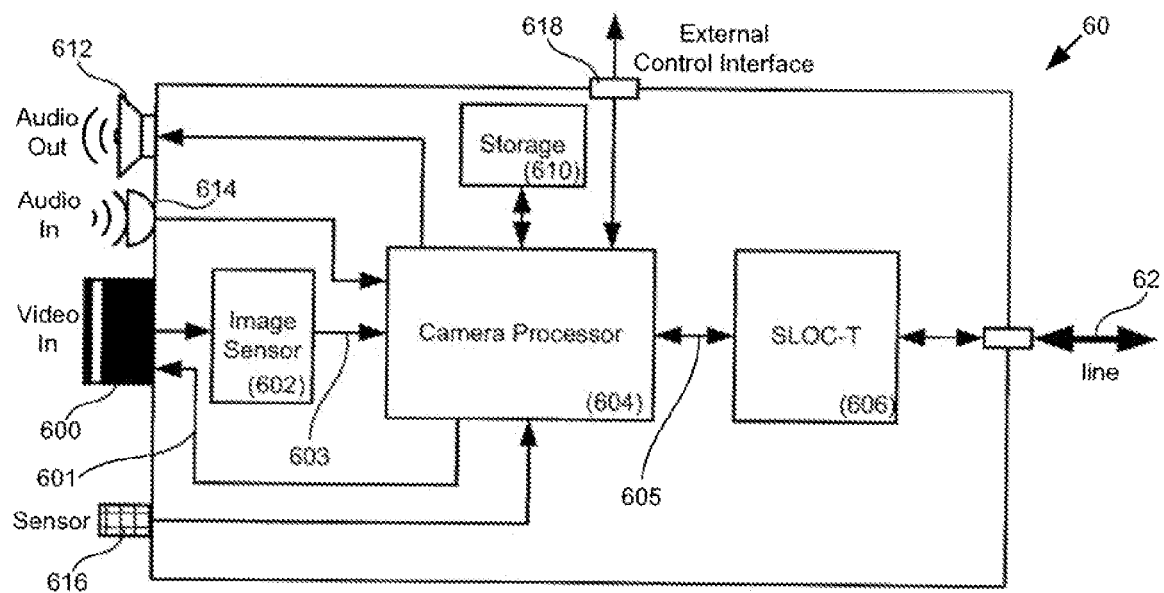
FIG. 6 illustrates an example of CCTV camera equipment constructed according to certain aspects of the invention.

Turning now to FIG. 6, certain embodiments of the invention provide enhanced capabilities applicable to security systems. In the depicted example, camera 60 comprises a modem SLOC-T 606 and a processor configured and adapted to provide digitally encoded multimedia signals in accordance with certain aspects of the invention. Sequences of images can be captured using a combination of optics 600 and an image sensor 602 including combinations of lens systems and CCD sensors known to those with skill in the art. Processor 604 typically receives a scan signal 603 from image sensor 602 which provides sequences of images captured according to a desired or predefined frame rate.

In some embodiments, image sensor 602 may include hardware and logic to convert a scanned analog signal representative of images captured by one or more sensors and can produce a digital video signal. For example, image sensor 602 may include RGB (red, green, blue) sensors and image sensor 602 may process the RGB sensor outputs internally to produce a digitally encoded color video signal as its output 603. In other embodiments, processor 604 may preprocess signal 603 from image sensor 602 to obtain a raw digital video signal. The raw digital video, whether obtained internally or received from image sensor 602 may be processed further by processor 604 to obtain an initial HD digital video signal. An analog standard definition signal may be obtained by processing the raw digital video signal, output 603 of sensor 602 or the initial HD digital video signal. Processor 604 may then format the initial HD digital video signal to obtain one or more HD digital video signals conforming to broadcast and other standards. For example, processor 604 may produce a signal that conforms to broadcast video standards such as ATSC and DVB standards. Processor 604 may additionally compress the digital video signal.

Camera processor 604 may comprise a combination of commercially available components and custom hardware and software. In one example, processor may include one or more microprocessors, digital signal processors, microcontrollers, sequencers and other programmable devices in combination with memory and support logic to perform a sequence of steps, instructions and/or programs. Storage 610 may be used to store computer readable instructions that, when executed, perform some or all of the functions described in this application. Camera processor 604 may include some built-in or "hard-coded" processes that can be used for construction of certain embodiments of the invention. Storage 610 may also be used for program scratch memory and/or to maintain configuration information. In certain embodiments, storage 610 may be used to store recordings of video captured by camera 60. Therefore, storage 610 may be implemented using volatile and non-volatile memory, optical and magnetic disks, removable electrically erasable memory, USB memory drives and other semiconductor, electromagnetic and optical storage devices.

Signal 605 includes video signals provided by processor 604 to SLOC-T 606 and upstream control, audio and other upstream information received from line 62, forwarded by SLOC-T 606 to processor 604. Upstream audio information may be decoded, processed and/or formatted by processor 604 before the audio is relayed to a loudspeaker, transducer or other audio output system 612. Processor may amplify the audio signal or may employ a separate amplifier in audio output component 612. Upstream control may include optics control 601 and control signals for external devices, typically provided through control interface 618. External devices may include motors or actuators used to translate, rotate or otherwise orient the camera 60. Optics control signal 601 and external control signals 618 may be generated in response to predefined commands by a remote control system. For example, a remote user may manipulate a joystick that generates a sequence of coded instructions interpreted by camera processor 604 to mean "rotate camera 90 degrees clockwise in horizontal plane," and processor 604 may respond by sending a series of pulses to a stepping motor axially mounted relative to camera 60 such that the series of pulses causes the desired rotation of camera 60 about its vertical axis. Similar commands may adjust focus, zoom and iris of optics 600.

In another example, instructions and data may be provided in the upstream control information that can be used to control function of processor 604 and/or sensor 602. The instructions and data may be used to select an area within the field of view of the camera 60 for encoding in one or more of the downstream video signals. In certain embodiments, processor and sensor cooperate to provide one or more virtual cameras that can be manipulated remotely to designate portions of the field of view to be encoded, whereby the portions are selected by virtual pan, zoom and tilt functions that operate within the actual field of view determined by the optics of camera 60. In certain embodiments, processor 604 can additionally cause physical movement of the camera, thereby extending the range of pan, tilt and zoom functions.

It is contemplated that, in at least some embodiments, the CVBS and digital signals may each carry a portion of the image captured by image sensor 602. Image portions may overlap or may be from different areas within the field of view provided by lens 600. Moreover, in certain embodiments, additional cameras 60 and/or additional image sensors 602 may be used to expand the available field of view. For example, it may be desirable to configure plural cameras to obtain a panoramic (360°) view of an area. One or more processors 604 may provide analog and digital signals representing the view, or a portion of the view. In one example, the complete panoramic view may be provided in a digital signal that can be recorded on a DVR, while the CVBS signal may provide a selectable view within the panorama. The selectable view may be controlled using zoom, pan and other controls. In another example, CVBS and digital signals may provide a common or different portion of the panoramic view and the portions may be independently controllable by a remote viewer.

Figure 7:
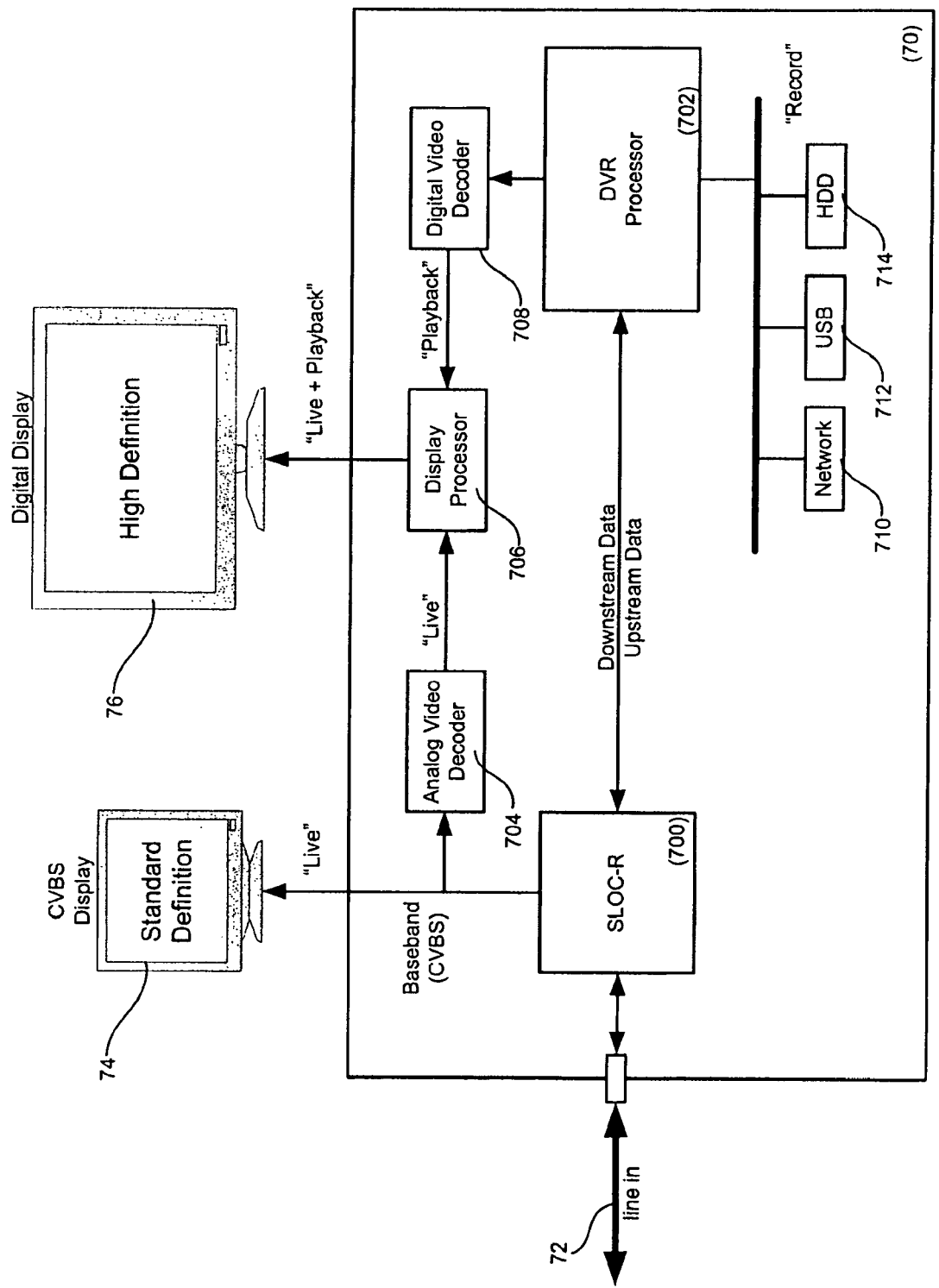
FIG. 7 illustrates an example of a modem used in DVR equipment constructed according to certain aspects of the invention.

FIG. 7 depicts an example of the use of a SLOC-R 700, similar to SLOC-R 320 described in FIG. 3, in a security digital video recording system 70. System 70 comprises SLOC-R 700, a DVR processor 702 connected to peripherals 710, 712 and 714, an analog video decoder 704, a digital video decoder 708 and HD digital display processor 706. As described above, SLOC-R 700 receives and decodes signal from Coax 72, which typically comprises an analog standard definition video signal and an HD digital video signal. SLOC-R 700 also transmits upstream audio and control signals through Coax 72. SLOC-R typically splits the analog CVBS signal from the HD digital video signal in input signal 72, providing the digital video signal 703 to processor 702 and the CVBS signal 701 to a standard definition monitor 74 as a live feed from the camera 60 shown in FIG. 6. SLOC-R 700 may optionally provide the analog baseband video signal 701 to analog video decoder 704, which processes the signal to produce a digital standard definition video signal 705. Display processor 706 multiplexes and/or selects between digital standard definition signal 705 and a signal 707 derived from playback of stored HD digital video. Display processor may provide the selected signal in a format displayable by HD television or monitor 76.

DVR processor 702 receives digital HD video signal 703 and optionally stores at least a portion of the signal as a recording of the video captured by camera 60. The recording may be stored in a local hard disk drive 714, on networked storage (not shown) or in other optical, electromagnetic or semiconductor storage connected through network interface 710 and/or USB/Firewire or other local bus 712. The recorded video may be further compressed to save storage space. DVR processor may retrieve recorded video and provide a playback signal 707 using digital video decoder 708.

Figure 8:
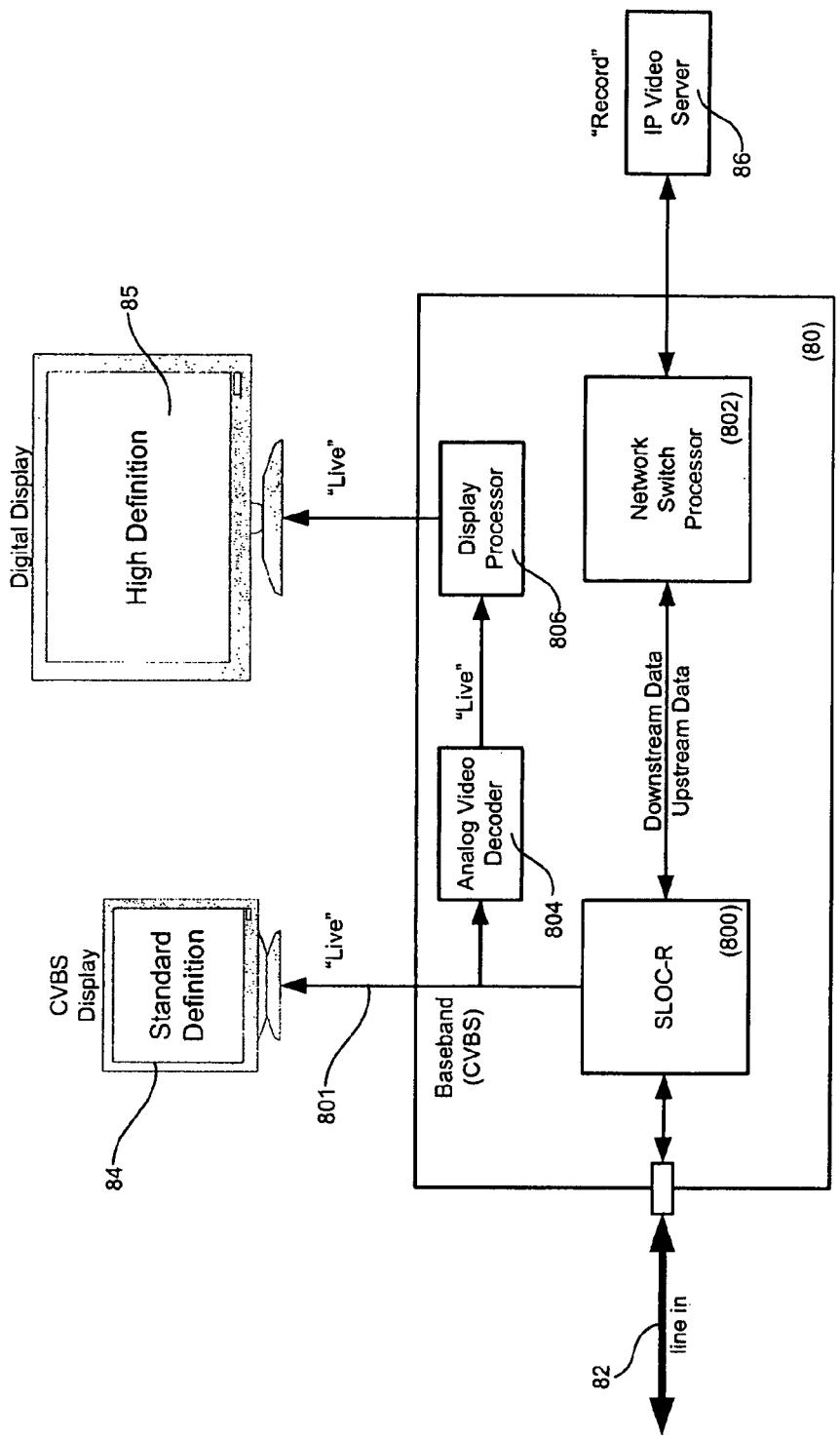
FIG. 8 illustrates an example of a modem used in network switch equipment constructed according to certain aspects of the invention.

FIG. 8 depicts an example of the use of a SLOC-R 800, similar to SLOC-R 440 depicted in FIG. 4, in a networked security device 80. Device 80 comprises SLOC-R 800 and a network switch processor 802, typically connected by a network to IP video server 86. As described above, SLOC-R 800 receives and decodes signal from Coax 82, which typically comprises an analog standard definition video signal and a HD digital video signal. SLOC-R 800 optionally transmits upstream audio and control signals through Coax 82. SLOC-R typically splits the analog CVBS signal from the HD digital video signal in input signal 82, providing the digital video signal 803 to processor 802 and the CVBS signal 801 to a standard definition monitor 84 as a live feed from camera 60 shown in FIG. 6. In certain embodiments, SLOC-R 80 may include components 804, 806 or the like, to digitize the CVBS signal 801 for use with a digital display such as high definition display 85, also as a live feed from camera 60 shown in FIG. 6. It will be appreciated, however, that a suitably equipped display device or computing device may receive CVBS signal 801 and perform digitization of the signal. Network switch processor 802 receives digital HD video signal 803 and optionally transmits the signal to a network video server 86 which can then maintain a recording of the video captured by camera 60. The digital HD video signal 803 may be further compressed before transmission to video server 86.

Referring once again to FIGS. 5 and 6, certain embodiments of the invention permit the content of baseband analog signal 50 and downstream signal 52 to be selected as desired. In one example, both baseband signal 50 and downstream signal 52 contain the same image, the former in analog form and the latter encoded digitally. The digital image can be optionally and selectively transmitted compressed and uncompressed, in standard-definition and high-definition and at full frame rate or reduced frame rate. In another example, baseband signal 50 provides a portion of the full image captured by image sensor 602 while the downstream signal 52 carries the full image. In another example, baseband signal 50 provides the full image provided by the image sensor while the downstream contains a portion of the full image. Consequently, a highly configurable system is contemplated that allows users of digital cameras to select from a wide range of options for displaying, recording and transmitting video images.

ADDITIONAL DESCRIPTIONS OF CERTAIN ASPECTS OF THE INVENTION

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems and methods related to a camera. Some of these embodiments comprise a processor that receives an image signal from an image sensor and produces a plurality of video signals representative of the image signal and an encoder combining the baseband video signal and the digital video signal as an output signal for transmission over a cable. In some of these embodiments, the video signals include a baseband video signal and a digital video signal. In some of these embodiments, the combined baseband and digital video signals are substantially isochronous. In some of these embodiments, the camera is a closed circuit high definition television camera. In some of these embodiments, the baseband video signal comprises a standard definition analog video signal. In some of these embodiments, the digital video signal is modulated before combination with the baseband video signal. In some of these embodiments, the digital video signal comprises compressed digital video. In some of these embodiments, the digital video signal is a high definition digital video signal. In some of these embodiments, the frame rate of the digital video signal is less than the frame rate of the image signal. In some of these embodiments, the modulated digital signal is provided to a video recorder.

Some of these embodiments comprise a decoder configured to demodulate an upstream signal received from the cable. In some of these embodiments, the demodulated upstream signal comprises control signals. In some of these embodiments, the control signals include signals to control the position and orientation of the camera. In some of these embodiments, the control signals include signals to control the production of the baseband video signal and the digital video signal by the processor. In some of these embodiments, the control signals include a signal to select a portion of the image signal for encoding as the baseband video signal. In some of these embodiments, the control signals include a signal to select a portion of the image signal for encoding as the digital video signal. In some of these embodiments, the demodulated upstream signal comprises an audio signal for driving an audio output of the camera.

Certain embodiments of the invention provide systems and methods for transmitting video images. Some of these embodiments comprise frequency division multiplexing a video signal received from a high definition imaging device to obtain a modulated digital signal, producing an output signal by combining the modulated digital signal with a baseband analog signal representative of the video signal and transmitting the output signal simultaneously to a display system and digital video capture and/or storage device. In some of these embodiments, the display system displays an image derived from the baseband analog representation of the video signal. In some of these embodiments, the digital video storage records a sequence of high definition frames extracted from the modulated digital signal using a digital video recorder.

Some of these embodiments comprise compressing the video signal. In some of these embodiments, the step of frequency division multiplexing the digital video signal includes compressing the video signal prior to modulation. In some of these embodiments, transmitting the output signal includes providing the output signal to a coaxial cable. Some of these embodiments comprise demodulating an input signal received from the coaxial cable to obtain a control signal. Some of these embodiments comprise generating the baseband analog signal by encoding a portion of the video signal in a composite video signal. Some of these embodiments comprise selecting the portion of the video signal to be encoded in the composite video signal using the control signal. Some of these embodiments comprise controlling a position of the camera using the control signal. In some of these embodiments, demodulating the input signal includes extracting an audio signal from the input signal.

Certain embodiments of the invention provide systems and methods for operating cameras. Some of these embodiments comprise a processor that receives an image signal from an image sensor and produces a plurality of video signals, control logic configured to respond to a control signal received by the camera and a modulator configured to modulate the digital video signal as a modulated signal. In some of these embodiments, the plurality of video signals includes a baseband video signal and a digital video signal. In some of these embodiments, each of the plurality of video signals represents at least a portion of a field of view of the camera. In some of these embodiments, the control signal controls the content of the baseband and digital video signals. In some of these embodiments, the modulated signal and the baseband video signal are transmitted simultaneously by the camera.

In some of these embodiments, the baseband and digital video signals are substantially isochronous. Some of these embodiments comprise an encoder that combines the baseband video signal and the modulated signal as an output signal for transmission over a cable. In some of these embodiments, the control signal is received as a wireless signal. In some of these embodiments, the modulated signal is transmitted wirelessly. In some of these embodiments, the digital video signal is a high definition digital video signal. In some of these embodiments, the digital video signal comprises compressed digital video. In some of these embodiments, the control signal moves the portion of the field of view represented by one of the video signals.

Although the present invention has been described with reference to specific exemplary embodiments, it will be evident to one of ordinary skill in the art that various modifications and changes may be made to these embodiments without departing from the broader spirit and scope of the invention. For example, systems have been described which provide compressed digital HD video concurrently with a baseband analog video signal. Other embodiments of the invention provide simultaneous standard definition digital and analog feeds. Other embodiments provide full frame rate digital HD video along with the baseband analog video. Accordingly, the specification and drawings are to be regarded in an illustrative rather than a restrictive sense.

What is claimed is:

1. A camera, comprising:
   an image sensor;
   a processor that receives an image signal from the image sensor and produces a plurality of video signals representative of the image signal, the video signals including an analog video signal and a digital video signal; and
   a modem that modulates the digital video signal to obtain a modulated digital video signal centered on a carrier frequency,
   wherein the modulated digital video signal is transmitted over a coaxial cable,
   wherein the analog video signal is transmitted in the baseband of the coaxial cable as a baseband video signal that can be received by a display system connected to the coaxial cable and extracted by the display system using a low pass filter, and
   wherein the frequencies of the modulated digital signal lie beyond the highest frequency of the baseband video signal.

2. The camera of claim 1, wherein the baseband video signal and the digital video signal are substantially isochronous.

3. The camera of claim 1, wherein the baseband video signal comprises a standard definition analog video signal.

4. The camera of claim 1, wherein the modem modulates the digital video signal is into a band of frequencies separated from the upper frequencies of the baseband video signal and wherein the camera further comprises an encoder adapted to combine the modulated digital video signal with the baseband video signal for transmission over the coaxial cable.

5. The camera of claim 4, wherein the digital video signal is a high definition digital video signal.

6. The camera of claim 4, wherein the frame rate of the digital video signal is less than the frame rate of the image signal.

7. The camera of claim 4, wherein the modulated digital signal is provided to a video capture device.

8. The camera of claim 1, further comprising a decoder configured to demodulate an upstream signal received from the coaxial cable, wherein the demodulated upstream signal comprises control signals.

9. The camera of claim 8, wherein the control signals include signals to control the position and orientation of the camera.

10. The camera of claim 8, wherein the control signals include signals to control the production of the baseband video signal and the digital video signal by the processor.

11. The camera of claim 10, wherein the control signals include a signal to select a portion of the image signal for encoding as the baseband video signal.

12. The camera of claim 10, wherein the control signals include a signal to select a portion of the image signal for encoding as the digital video signal.

13. The camera of claim 8, wherein the demodulated upstream signal comprises an audio signal for driving an audio output of the camera.

14. A method for transmitting video images, comprising:
   frequency division multiplexing a video signal received from a video imaging device to obtain a modulated digital signal;

producing an output signal by adding an unmodulated analog signal to the modulated digital signal as a baseband analog signal representative of the video signal; and transmitting the output signal to one or more of a digital video capture device and a display system, wherein a video image derived from the baseband portion of the transmitted output signal is directly displayable by the display system.

15. The method of claim 14, wherein the digital video capture device records a sequence of frames extracted from the modulated digital signal.

16. The method of claim 14, wherein the digital video capture device is a video server.

17. The method of claim 14, wherein transmitting the output signal includes providing the output signal to a coaxial cable, and further comprising demodulating an input signal received from the coaxial cable to obtain a control signal.

18. The method of claim 17, further comprising:
generating the baseband analog signal by encoding a portion of the video signal in a composite video signal; and
selecting the portion of the video signal to be encoded in the composite video signal using the control signal.

19. The method of claim 17, further comprising controlling a position of the camera using the control signal.

20. The method of claim 17, wherein demodulating the input signal includes extracting an audio signal from the input signal.

21. The method of claim 14, wherein the step of frequency division multiplexing the digital video signal includes
compressing the video signal, and
modulating the compressed video signal on a carrier.

22. The method of claim 14, wherein the baseband portion is extracted using a low pass filter to remove all signals except the baseband signal.

23. A camera, comprising:
a processor that receives an image signal from an image sensor and produces a plurality of video signals, each of the plurality of video signals being representative of at least a portion of a field of view of the camera, and wherein the plurality of video signals includes a baseband video signal and a digital video signal;

control logic configured to respond to a control signal received by the camera, wherein the control signal controls the content of the baseband and digital video signals; and a modulator configured to modulate the digital video signal, wherein the modulated digital video signal is transmitted in a first band of frequencies on a cable and the baseband video signal is transmitted in the baseband on the cable, and wherein the modulated digital video signal and the baseband video signal are transmitted simultaneously by the camera through the cable to one or more of a display device, a recording device and a video server.

24. The camera of claim 23, wherein the control signal moves the portion of the field of view represented by at least one of the plurality of video signals.

25. The camera of claim 23, wherein the control signal is received as a wireless signal.

26. The camera of claim 23, wherein the modulated digital video signal is transmitted wirelessly.

27. The camera of claim 23, wherein the baseband and digital video signals are substantially isochronous.

28. The camera of claim 23, further comprising an encoder that combines the baseband video signal and the modulated digital video signal as an output signal for transmission over a cable.

* * * * *